(12) United States Patent
Otsubo

(10) Patent No.: US 11,092,286 B2
(45) Date of Patent: Aug. 17, 2021

(54) HIGH PRESSURE TANK

(71) Applicant: TOYOTA JIDOSHA KABUSHIKI KAISHA, Toyota (JP)

(72) Inventor: Hirokazu Otsubo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 76 days.

(21) Appl. No.: 16/661,247

(22) Filed: Oct. 23, 2019

(65) Prior Publication Data

US 2020/0132251 A1 Apr. 30, 2020

(30) Foreign Application Priority Data

Oct. 30, 2018 (JP) .............................. JP2018-203925

(51) Int. Cl.
*F17C 1/02* (2006.01)

(52) U.S. Cl.
CPC ........ *F17C 1/02* (2013.01); *F17C 2201/0109* (2013.01); *F17C 2203/012* (2013.01); *F17C 2203/0604* (2013.01); *F17C 2203/067* (2013.01); *F17C 2203/0621* (2013.01)

(58) Field of Classification Search
CPC ................ F17C 1/02; F17C 2201/0109; F17C 2201/0123; F17C 2201/0176; F17C 2201/0195; F17C 2203/067; F17C 2203/012; F17C 2203/0621; F17C 2203/0604; F17C 2203/0665; F17C 2203/0695

See application file for complete search history.

(56) References Cited

U.S. PATENT DOCUMENTS

| | | | | |
|---|---|---|---|---|
| 2012/0048862 A1* | 3/2012 | Otsuka | ................... | F17C 13/06 |
| | | | | 220/495.01 |
| 2013/0087567 A1* | 4/2013 | Kaneko | .................... | F17C 1/06 |
| | | | | 220/590 |
| 2016/0341359 A1* | 11/2016 | Nishibu | ............... | B29C 53/605 |

FOREIGN PATENT DOCUMENTS

| | | |
|---|---|---|
| CN | 107742001 A | 2/2018 |
| JP | 2016/217466 | 12/2016 |
| JP | 2018-099828 | 6/2018 |

* cited by examiner

*Primary Examiner* — Don M Anderson
(74) *Attorney, Agent, or Firm* — Finnegan, Henderson, Farabow, Garrett & Dunner, LLP

(57) ABSTRACT

A high pressure tank includes: a liner having a space in which a gas is sealed; and a reinforcement layer configured to cover a periphery of the liner. The liner has a cylinder portion in a cylindrical shape, and a pair of dome portions provided at both ends of the cylinder portion in an axial direction of the cylinder portion. A curved surface shape of each dome portion is an equally stressed curved surface shape when an internal pressure of the liner reaches a setting pressure set higher than the atmospheric pressure.

4 Claims, 4 Drawing Sheets

FIG. 5

|  | FIRST EMBODI- MENT EXAMPLE | SECOND EMBODI- MENT EXAMPLE | THIRD EMBODI- MENT EXAMPLE | FOURTH EMBODI- MENT EXAMPLE | FIFTH EMBODI- MENT EXAMPLE | SIXTH EMBODI- MENT EXAMPLE | SEVENTH EMBODI- MENT EXAMPLE | EIGHTH EMBODI- MENT EXAMPLE |
|---|---|---|---|---|---|---|---|---|
| RADIUS OF CURVATURE | 6 | 10 | 20 | 30 | 10 | 20 | 10 | 20 |
| INCLINATION $\alpha$ | 0 | 0 | 0 | 0 | 7 | 7 | 15 | 15 |
| STRAIN | 1.92 | 1.85 | 1.65 | 1.67 | 2.17 | 1.90 | 2.47 | 2.48 |

HIGH PRESSURE TANK

INCORPORATION BY REFERENCE

The disclosure of Japanese Patent Application No. 2018-203925 filed on Oct. 30, 2018 including the specification, drawings and abstract is incorporated herein by reference in its entirety.

BACKGROUND

1. Technical Field

The present disclosure relates to a high pressure tank.

2. Description of Related Art

Some liners included in high-pressure tanks for storing fuel gas for use in natural gas vehicles, fuel cell automobiles, and others may each have a cylinder portion in a cylindrical shape and a pair of dome portions provided at both ends in the axial direction of the cylinder portion (see Japanese Patent Application Publication No. 2018-099828 (JP 2018-099828 A)).

SUMMARY

JP 2018-099828 A describes that a curved surface shape of each dome portion is configured to be an equally stressed curved surface shape in a state where the gas is supplied in the high pressure tank. However, since the high-pressure tank is deformed by its internal pressure, there is room for considering that the curved surface of each dome portion should become an equally stressed curved surface after how much gas is supplied in the high-pressure tank.

The present disclosure can be realized as the following aspect.

According to one aspect of the present disclosure, provided is a high pressure tank. This high pressure tank includes: a liner having a space in which a gas is sealed, the liner having a cylinder portion in a cylindrical shape and a pair of dome portions provided at both ends of the cylinder portion in an axial direction of the cylinder portion; and a reinforcement layer configured to cover a periphery of the liner, wherein a curved surface shape of each of the dome portions is an equally stressed curved surface shape when an internal pressure of the liner reaches a setting pressure set higher than an atmospheric pressure.

According to the above aspect, it is possible to reduce strain generated in the reinforcement layer when the internal pressure of the liner reaches the setting pressure, as compared with the high pressure tank with the dome portions each having the equally stressed curved surface shape when the internal pressure of the liner is at the atmospheric pressure. Therefore, in such a high pressure tank, since the reinforcement layer can be set thinner than that of the high pressure tank with the dome portions each having the equally stressed curved surface shape when the internal pressure of the liner is at the atmospheric pressure, it is possible to realize reduction in mass of the high pressure tank and reduction in cost for manufacturing the high pressure tank.

In the above aspect, the setting pressure may be a pressure that causes the liner to burst.

According to the above aspect, it is possible to reduce strain generated in the reinforcement layer when the internal pressure of the liner reaches a pressure that causes the liner to burst, as compared with the high pressure tank with the dome portions each having the equally stressed curved surface shape when the internal pressure of the liner is at the atmospheric pressure.

In the above aspect, the setting pressure may be a maximum charging pressure of the high pressure tank.

According to the above aspect, the reinforcement layer can be set thinner, as compared with the high pressure tank with the dome portions each having the equally stressed curved surface shape when the internal pressure of the liner reaches a pressure that causes the liner to burst; thus, it is possible to realize reduction in mass of the high pressure tank as well as reduction in cost for manufacturing the high pressure tank.

In the above aspect, an inclination of the dome portion relative to the cylinder portion at a joint portion between the cylinder portion and the dome portion may be 0 degrees and a radius of curvature of the joint portion may be within a range of 6 mm to 30 mm, or the inclination may be 7 degrees and the radius curvature of the joint portion may be within a range of 10 mm to 20 mm.

According to the above aspect, it is possible to reduce strain generated in the reinforcement layer covering the joint portion.

The present disclosure is not limited to a high pressure tank, and can be applied to various forms such as a method for manufacturing a high pressure tank, a manufacturing apparatus for a high pressure tank, and the like. The present disclosure is not limited to the above-described aspect at all, and it is needless to mention that the present disclosure can be implemented in various forms without departing from the spirit of the present disclosure.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is an explanatory view representing numeral values of shapes and strains in reinforcement layers of the respective embodiment examples.

DETAILED DESCRIPTION OF EMBODIMENTS

A. First Embodiment

Figure 1:
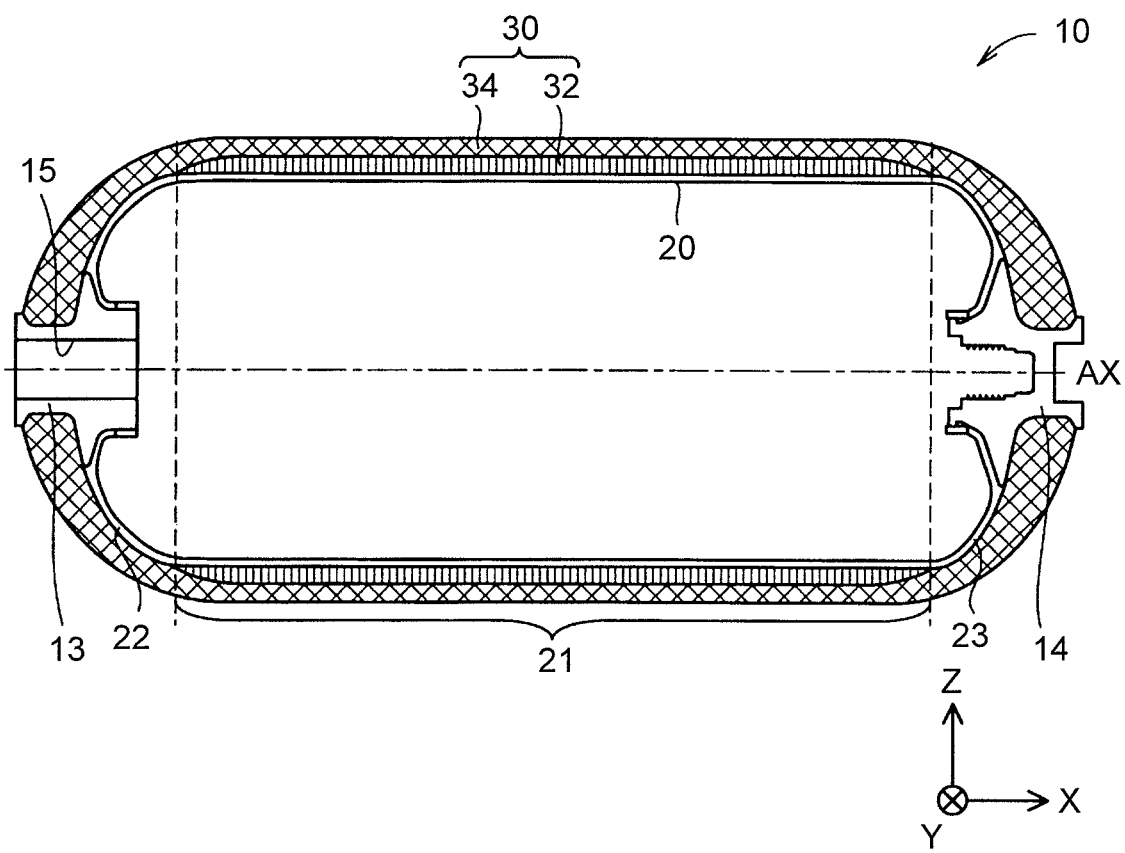
FIG. 1 is a sectional view showing a schematic configuration of a high pressure tank of the first embodiment.

FIG. 1 is a sectional view showing a schematic configuration of a high pressure tank 10 of the first embodiment. XYZ axes orthogonal to one another are illustrated in FIG. 1. The XYZ axes in FIG. 1 correspond to XYZ axes in the other drawings. The high pressure tank 10 of the present embodiment stores a high pressure hydrogen gas of approximately 70 MPa, for example. The high pressure tank 10 includes a liner 20 and a reinforcement layer 30.

The liner 20 is a hollow liner made of resin and forms a space in which a gas is sealed. The liner 20 is made of, for example, a thermoplastic resin such as polyethylene, nylon, polypropylene, and polyester. The liner 20 has an axis common to an axis AX of the high pressure tank 10. The liner 20 includes a cylinder portion 21 and dome portions 22, 23.

The cylinder portion 21 has a cylindrical shape. The dome portions 22, 23 are provided at both ends of the cylinder portion 21 in the axial direction of the cylinder portion 21, and are each formed in a curved surface shape that is convex outward of the liner 20. On the tops of the dome portions 22, 23, mouthpieces 13, 14 made of metal such as aluminum and stainless steel are provided, respectively. The mouthpiece 13 on one side has a through hole 15, and is used for taking out the gas from the high pressure tank 10 or charging the high pressure tank 10 with the gas. The mouthpiece 14 on the other side is used for rotating the liner 20 at the time of reinforcing the liner 20 or forming the reinforcement layer of the liner 20. The mouthpiece 14 may be omitted.

The curved surface shape of each of the dome portions 22, 23 is an equally stressed curved surface shape when the internal pressure of the liner 20 reaches a setting pressure set higher than the atmospheric pressure. In the present embodiment, the setting pressure is a burst pressure that is a pressure causing the liner 20 to burst. The burst pressure referred to herein is a pressure falling within a range of −5% to +5% with reference to the pressure when a crack is confirmed in any part of the liner 20 after the liner 20 in a state of not being covered by the reinforcement layer 30 is charged with a hydrogen gas. A pressure value of such a burst pressure is previously found through experimental measurement or measurement by simulation. The burst pressure in the liner 20 of the present embodiment is a pressure within a range of 171 MPa to 189 MPa with reference to the pressure of 180 MPa. An equally stressed curved surface shape denotes a curved surface shape in which a tension on a curved surface of interest becomes equal at any position and in any orientation of this curved surface when an internal pressure is applied. In the present embodiment, since the curved surface shape of each of the dome portions 22, 23 is an equally stressed curved surface shape when the internal pressure of the liner 20 reaches the burst pressure, theoretically, no crack occurs but breakage occurs over the entire curved surface of each of the dome portions 22, 23 at the time of the burst pressure. It is confirmed, by the simulation with CAE (computer aided engineering) used when the liner 20 is designed, that the dome portions 22, 23 each have an equally stressed curved surface shape when the internal pressure of the liner 20 reaches the setting pressure. As the curved surface shape of each dome portion 22, 23, there is actually adopted a shape formed when the internal pressure of the liner 20 is returned to the atmospheric pressure, after the curved surface shape of the dome portion is adjusted, by the simulation, to become an equally stressed curved surface shape when the internal pressure of the liner 20 reaches the setting pressure.

The reinforcement layer 30 is a layer covering the periphery of the liner 20 so as to serve reinforce the liner 20. The reinforcement layer 30 includes a hoop layer 32 and a helical layer 34.

The hoop layer 32 is configured by hoop-winding a fiber bundle around the cylinder portion 21. The fiber bundle used for the hoop winding is configured by impregnating a fiber bundle made of carbon fibers with a thermosetting resin such as an epoxy resin.

The helical layer 34 is configured by helically-winding a fiber bundle around the hoop layer 32 and the dome portions 22, 23. The fiber bundle used for the helical winding is configured by impregnating a fiber bundle made of carbon fibers with a thermosetting resin such as epoxy resin, as with the fiber bundle used for the hoop winding.

The thickness of the hoop layer 32 and the thickness of the helical layer 34 are appropriately set depending on the pressure resistance and the strength respectively required for the high pressure tank 10.

Figure 2:
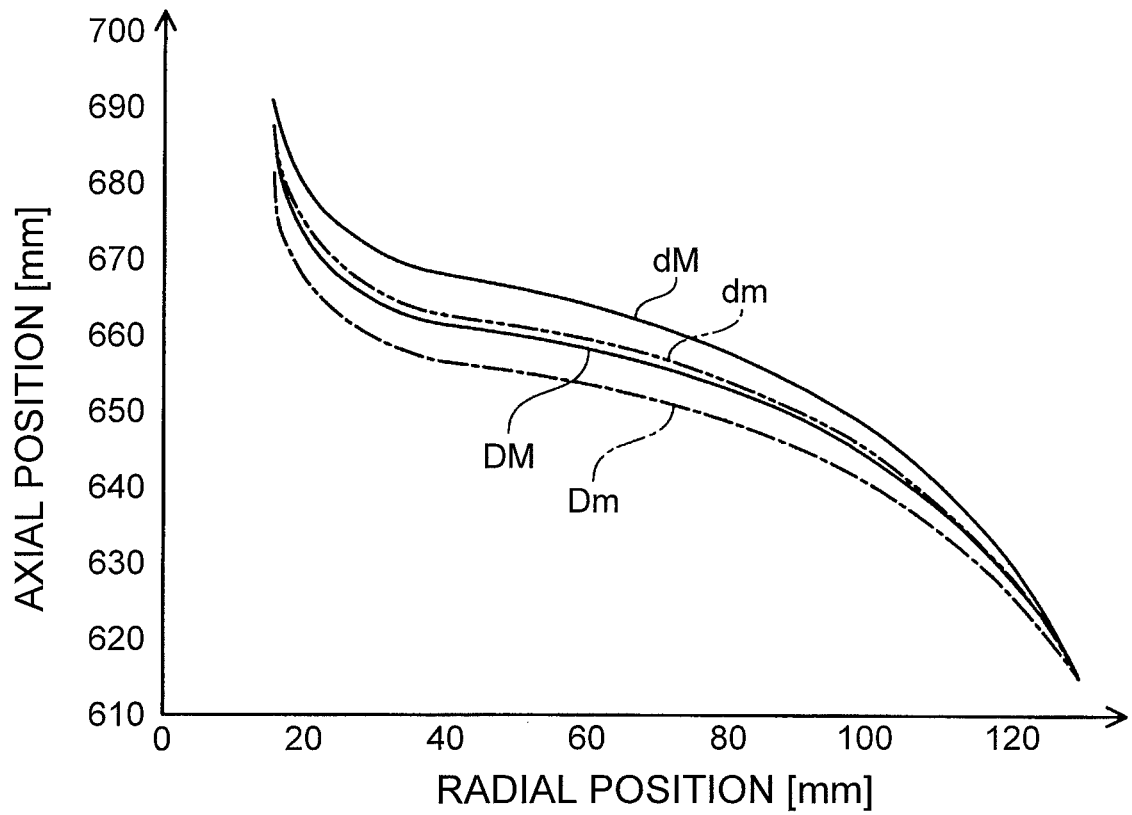
FIG. 2 is an explanatory view explaining a dome portion shape.

FIG. 2 is an explanatory view explaining a dome portion shape of the liner 20 of the present embodiment and a dome portion shape of a liner of a comparative example. The configuration of the liner of the comparative example is the same as the liner 20 of the present embodiment except that they have different pressures when the curved surface shape of each dome portion becomes an equally stressed curved surface shape.

In the graph shown in FIG. 2, a vertical axis indicates an axial position in the high pressure tank. An axial position indicates a distance from a central position in an axis AX direction of the high pressure tank. A horizontal axis indicates a radial position in the high pressure tank. A radial position indicates a distance in a Z-axis direction from the axis AX of the high pressure tank.

In the graph shown in FIG. 2, an one-dot chain line Dm indicates a dome portion shape when the internal pressure of the liner 20 of the present embodiment is at the atmospheric pressure. A two-dot chain line dm indicates a dome portion shape when the internal pressure of the liner of the comparative example is at the atmospheric pressure. A solid line DM indicates a dome portion shape when the internal pressure of the liner 20 of the present embodiment is at 180 MPa. A solid line dM indicates a dome portion shape when the internal pressure of the liner of the comparative example is at 180 MPa. 180 MPa is a pressure falling within the range of the burst pressure in the liner 20. Further, the respective dome portion shapes indicated by the one-dot chain line Dm, the two-dot chain line dm, the solid line DM, and the solid line dM show the dome portion shapes of the respective liners without being covered with the reinforcement layers.

When the internal pressure of the liner is at the atmospheric pressure, the dome portion shape of the liner of the comparative example is an equal stressed curved surface shape. That is, the liner of the comparative example has the dome portions each having the equally stressed curved surface shape in a state where the liner is charged with no hydrogen gas and no tension caused by the internal pressure is applied to the dome portions. When the internal pressure of the liner is at the atmospheric pressure, each dome portion shape of the liner becomes the equally stressed curved surface shape, and this means that each dome portion shape becomes the equally stressed curved surface shape when the internal pressure increases in an amount of change as close to zero as possible from the atmospheric pressure. The dome portion shape of the liner of the comparative example at this time is indicated by the two-dot chain line dm. Then, when the liner of the comparative example in the state indicated by the two-dot chain line dm is charged with the hydrogen gas in an amount that allows the internal pressure of the liner to reach 180 MPa, the liner of the comparative example comes into the state indicated by the solid line dM.

To the contrary, when the internal pressure of the liner 20 of the present embodiment is at the atmospheric pressure, the liner 20 does not have an equally stressed curved surface shape. The dome portion shape of the liner 20 of the present embodiment at this time is indicated by the one-dot chain line Dm. When the liner 20 of the present embodiment in the state indicated by the one-dot chain line Dm is charged with the hydrogen gas in an amount that allows the internal pressure of the liner 20 to reach 180 MPa that is the burst pressure, the liner 20 of the present embodiment comes into the state indicated by the solid line DM. At this time, since the internal pressure of the liner 20 is at 180 MPa, the dome portion shape of the liner 20 of the present embodiment is the equally stressed curved surface shape. The curved surface shape of each dome portion of the liner of the comparative example is the equally stressed curved surface when the internal pressure of the liner is at the atmospheric pressure. To the contrary, the curved surface shape of each dome portion 22, 23 of the liner 20 of the present embodiment is the equally stressed curved surface shape when the internal pressure of the liner 20 is at the burst pressure.

Based on the comparison between the two-dot chain line dm and the one-dot chain line Dm, in the state where the internal pressure of the liner is at atmospheric pressure, the dome portion shapes of the liner 20 of the present embodiment are inwardly closer to each other than those of the liner of the comparative example. Further, based on the comparison between the solid line dM and the solid line DM, also in the state where the internal pressure of the liner is at 180 MPa, the dome portion shapes of the liner 20 of the present embodiment are inwardly closer to each other than those of the liner of the comparative example. That is, the liner 20 of the present embodiment can reduce strain generated in the reinforcement layer by expansion of the dome portions when the internal pressure of the liner increases higher than the atmospheric pressure, as compared with the liner of the comparative example. Strain referred to herein denotes any displacement, expansion, contraction, torsion, linear strain or surface strain, or any other deformation in a part of the reinforcement layer. Note that the strain generated in the reinforcement layer is calculated by the simulation with CAE.

Moreover, the dome portion shape of the liner of the comparative example is the equally stressed curved surface shape when the internal pressure of the liner is at atmospheric pressure. Hence, when the internal pressure of the liner increases higher than the atmospheric pressure, each dome portion shape deforms into a shape more greatly expanded than the equally stressed curved surface shape. The dome portion shape is different from a hemispherical shape because the mouthpiece is provided, and the thickness thereof is not uniform. Thus, when the dome portion shape is in a shape expanded from the equally stressed curved surface shape, the amount of deformation becomes different among the respective parts, as compared with the state where the dome portion shape is the equally stressed curved surface shape. Therefore, since the tension on the curved surface of each dome portion becomes irregular at the positions and the orientations of the curved surface of the dome portion, a large strain might be caused to the reinforcement layer depending on the positions and the orientations. To counter this strain, the thickness of the reinforcement layer may be increased, but in the high pressure tank provided with such a reinforcement layer, increase in mass of the tank is caused, which causes increase in cost for the tank. To the contrary, the dome portion shape of the liner 20 of the present embodiment is the equally stressed curved surface shape when the internal pressure of the liner 20 is at the burst pressure. Therefore, when the internal pressure of the liner 20 is at the burst pressure and the dome portions 22, 23 each have the equally stressed curved surface shape, the tension on the curved surface of each of the dome portions 22, 23 becomes equal at any position and in any orientation of the curved surface; thus, as compared with the liner of the comparative example, it is more unlikely to cause a great strain in the reinforcement layer 30. Accordingly, in the high pressure tank 10 of the present embodiment, it is possible to reduce increase in mass and increase in cost due to increase in thickness of the reinforcement layer, as compared with the high pressure tank of the comparative example.

According to the aforementioned first embodiment, it is possible to reduce strain generated in the reinforcement layer 30 when the internal pressure of the liner 20 reaches the pressure that causes the liner 20 to burst, as compared with the high pressure tank with the dome portions each having the equally stressed curved surface shape when the internal pressure of the liner is at the atmospheric pressure. Accordingly, in such a high pressure tank 10, since the reinforcement layer 30 can be set thinner, it is possible to realize reduction in mass of the high pressure tank 10 and reduction in cost for manufacturing the high pressure tank 10.

Since the dome portion shapes of the liner 20 of the present embodiment are closer to each other inward of the high pressure tank than those of the liner of the comparative example; for example, if the dimension of a mounting space for the high pressure tank is defined in a vehicle on which the high pressure tank is mounted, the following effects can be achieved. That is, when the high pressure tank 10 of the present embodiment and the high pressure tank of the comparative example both of which have the same length in the axis AX direction are designed in order to place the high pressure tanks in the respective mounting spaces, the high pressure tank 10 of the present embodiment can be configured such that the length of the cylinder portion 21 can be longer than that in the high pressure tank of the comparative example; thus it is possible to increase the storage amount of the gas.

Figure 3:
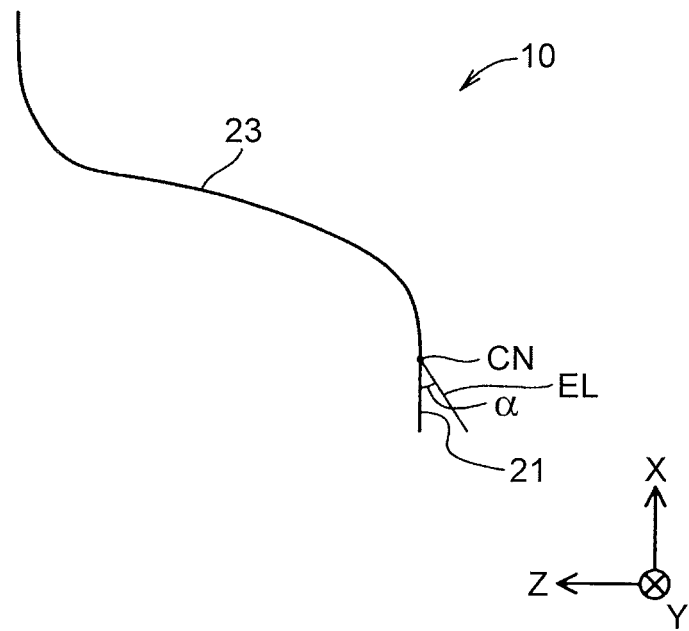
FIG. 3 is an enlarged view enlarging the vicinity of a joint portion between a cylinder portion and a dome portion.

FIG. 3 is an enlarged view of enlarging the vicinity of a joint portion CN between the cylinder portion 21 and the dome portion 23 in the configuration of the high pressure tank 10 according to the first embodiment. In the high pressure tank 10, when the internal pressure of the liner 20 is at the atmospheric pressure, an inclination α of each the dome portion 22, 23 relative to the cylinder portion 21 at the joint portion CN between the cylinder portion 21 and each dome portion 22, 23 (hereinafter, referred to as an inclination of the joint portion CN) is 0 degrees. The inclination α of the joint portion CN referred to herein is measured as follows. That is, assuming that an end point of the dome portion 23 on the side of the −X axis direction and an end point of the cylinder portion 21 on the side of the +X axis direction overlap each other at the joint portion CN, such an inclination that has an angle smaller than 90 degrees in the inclination of an extension line EL relative to the cylinder portion 21 is measured as the inclination α of the joint portion CN, where the extension line EL is defined by extending an tangent at the end point of the dome portion 23 on the side of the −X axis direction toward the side of the −X axis direction. Note that the inclination α of the joint portion CN in the high pressure tank 10 is 0 degrees; however, in FIG. 3, for convenience of understanding, the inclination α is illustrated to have an angle greater than 0 degrees.

Further, when the internal pressure of the liner 20 is at the atmospheric pressure, the joint portion CN has a curved surface with a curvature radius of 6 mm. It will be described below that the joint portion CN is formed in a curved surface shape defined by a radius of curvature. In the above description on the inclination α, for convenience of explanation, it is described that the end point of the dome portion 23 on the side of the −X axis direction overlaps the end point of the cylinder portion 21 on the side of the +X axis direction;

however, the joint portion of the actual liner is formed in the following shape. That is, before being processed into a curved surface, the joint portion CN is a portion where the end point of the dome portion 23 on the side of the −X axis direction and the end point of the cylinder portion 21 on the side of the +X axis direction overlap each other, and this joint portion CN has a corner because this portion corresponds to a part where the straight shape of the cylinder portion 21 along the X axis direction shifts to the curved shape of the dome portion 23. This corner is formed into a round shape defined by a radius of curvature by processing this corner into a curved surface, and this finished corner is the actual joint portion CN. In other words, the cylinder portion 21 and the dome portion 23 are actually joined to each other by the joint portion CN formed in a curved surface shape defined by the radius of curvature. In the designing process of the liner 20, during the simulation with CAE, the inclination α of each dome portion 22, 23 relative to the cylinder portion 21 at the joint portion CN between the cylinder portion 21 and each dome portion 22, 23 is determined (at this time, the joint portion CN is in a shape with a corner), and thereafter, the radius of curvature when the joint portion CN is processed (to make this portion round) is determined so as to change the shape of the joint portion CN from a shape with a corner to a round shape. Also in the manufacturing process of the actual liner 20, the corner is processed into a curved surface in the same manner as in the design process, to thereby make the joint portion CN round.

Figure 4:
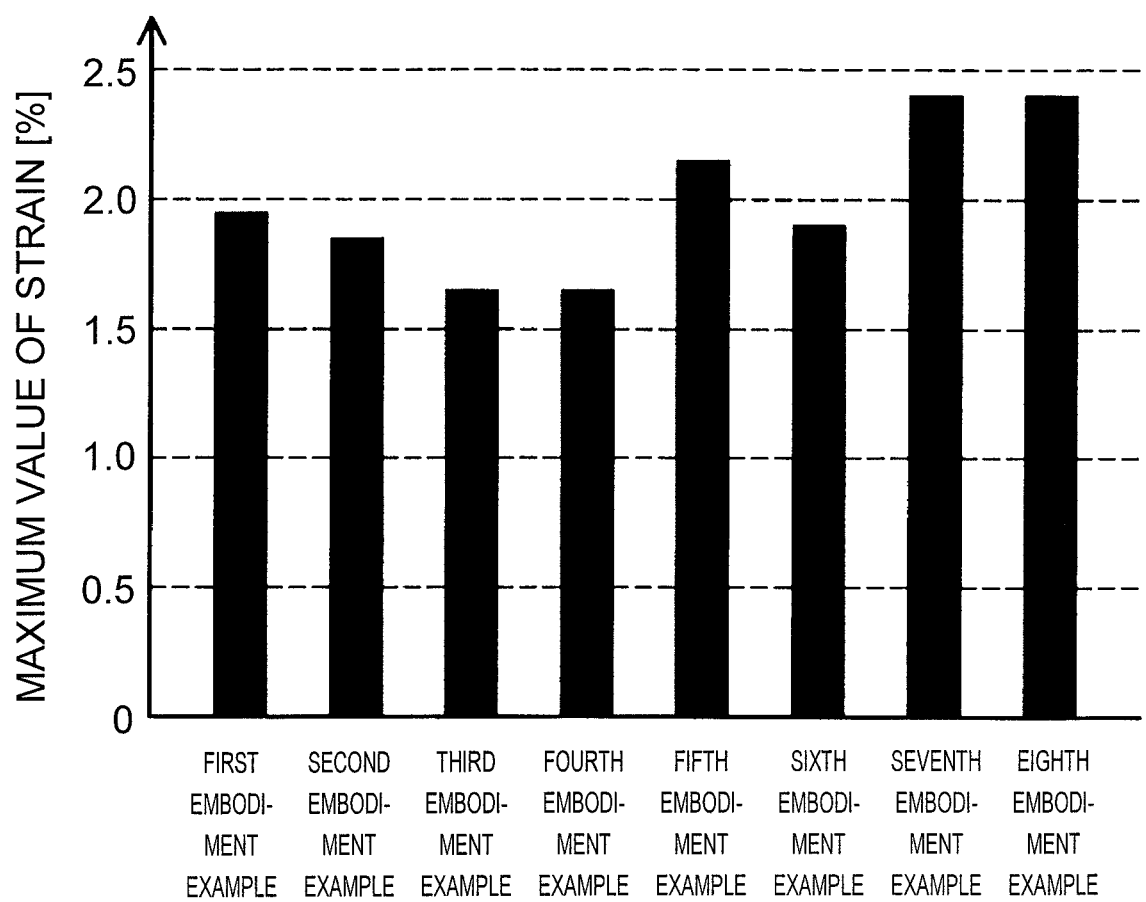
FIG. 4 is an explanatory view comparing strains in reinforcement layers of high pressure tanks of respective embodiment examples.

FIG. 4 and FIG. 5 are explanatory views comparing strains in the reinforcement layers of the high pressure tanks of respective embodiment examples. The vertical axis in FIG. 4 shows a maximum value of strain generated in the reinforcement layer 30 covering the joint portion CN when the high pressure tank of each embodiment example is charged with the hydrogen gas in an amount that allows the internal pressure of the liner to reach 180 MPa. FIG. 5 is an explanatory view showing numerical values of the radius of curvature defining the curved surface shape of the joint portion CN and of the inclination of the joint portion CN of each embodiment example, as well as the strain (the maximum value of the strain) in the reinforcement layer in the high pressure tank of each embodiment example. The portion of the reinforcement layer 30 used for the measurement is a portion of the first layer of the helical layer 34, the portion being first wound around the liner 20. Assuming that a state where no strain is generated in the reinforcement layer 30 is defined to be 0%, among strains generated by increase in internal pressure of the liner 20 from this state, a ratio of a strain generated in a portion which experiences the greatest strain is defined as a maximum value of the strain.

The first embodiment example is the high pressure tank 10 of the first embodiment. The inclination α of the joint portion CN in the first embodiment example is 0 degrees, and the joint portion CN has a curved surface with a radius of curvature of 6 mm. The inclination α of the joint portion CN in the second embodiment example is 0 degrees, and the joint portion CN has a curved surface with a radius of curvature of 10 mm. The inclination α of the joint portion CN in the third embodiment example is 0 degrees, and the joint portion CN has a curved surface with a radius of curvature of 20 mm. The inclination α of the joint portion CN in the fourth embodiment example is 0 degrees, and the joint portion CN has a curved surface with a radius of curvature of 30 mm.

The inclination α of the joint portion CN in the fifth embodiment example is 7 degrees, and the joint portion CN has a curved surface with a radius of curvature of 10 mm. The inclination α of the joint portion CN in the sixth embodiment example is 7 degrees, and the joint portion CN has a curved surface with a radius of curvature of 20 mm. The inclination α of the joint portion CN in the seventh embodiment example is 15 degrees, and the joint portion CN has a curved surface with a radius of curvature of 10 mm. The inclination α of the joint portion CN in the eighth embodiment example is 15 degrees, and the joint portion CN has a curved surface with a radius of curvature of 20 mm. The dome portions 22, 23 of the high pressure tank according to each of the first to eighth embodiment examples each have the equally stressed curved surface shape when the internal pressure of the liner 20 reaches the burst pressure. The radius of curvature defining the curved surface of the joint portion CN and the inclination α of the joint portion CN in the high pressure tank of each of the above-described first to eighth embodiment examples are represented by values when the internal pressure of the liner 20 is at the atmospheric pressure.

From the results in FIG. 4, in the first embodiment example, when the internal pressure of the liner 20 reaches the burst pressure, a strain of 1.92% is generated in the reinforcement layer 30. On the other hand, in the seventh embodiment example and the eighth embodiment example, when the internal pressure of the liner 20 reaches the burst pressure, strains of 2.47% and 2.48% are generated in the reinforcement layers 30, respectively. In the meantime, in the second embodiment example to the sixth embodiment example, among strains generated in the respective reinforcement layers 30 when the internal pressure of each liner 20 reaches the burst pressure, the minimum strain corresponds to 1.65% in the high pressure tank of the third embodiment example, and the maximum strain corresponds to 2.17% in the fifth embodiment example.

The high pressure tank of each of the above-described second to sixth embodiment examples can reduce strain generated in the reinforcement layer 30 covering the joint portion CN, as equally in the high pressure tank 10 of the first embodiment (first embodiment example). Therefore, in the high pressure tank of each of the second to sixth embodiment examples, since the reinforcement layer 30 can be set to have a thinner thickness than that of the high pressure tank of each of the seventh and eighth embodiment examples, it is possible to achieve reduction in mass of the high pressure tank as well as reduction in cost for manufacturing the high pressure tank.

B. Other Embodiments

In the above-described embodiment, the state in which the curved surface shapes of the dome portions 22, 23 are the equally stressed curved surfaces is determined by the internal pressure of the liner 20, but the present disclosure is not limited to this. For example, the state in which the curved surface shapes of the dome portions 22, 23 are the equally stressed curved surfaces may be determined by the curved surface tensions in the dome portions 22, 23 or the volumes of the dome portions 22, 23. The curved surface tension and the volume in this case denote a curved surface tension and a volume that cause the liner 20 to burst.

In the above-described embodiment, the setting pressure is set as a burst pressure that causes the liner 20 to burst, but the present disclosure is not limited to this. For example, the setting pressure may be a maximum charging pressure of the high pressure tank. The maximum charging pressure referred to in this case is specified by Article 2(25) of the Container Safety Regulation, and corresponds to a numerical value of the highest pressure among pressures of the gas with which a concerned container can be charged at a temperature of 35 degrees. For example, when the maximum charging pressure of the high pressure tank is 160 MPa, the setting pressure is 160 MPa. With this configuration, the reinforcement layer can be set thinner, as compared with that of the high pressure tank whose setting pressure is at the burst pressure, and whereby reduction in mass of the high pressure tank and reduction in cost for manufacturing the high pressure tank can be achieved.

The present disclosure is not limited to the above-described embodiments, embodiment examples, and modifications, and can be implemented with various configurations without departing from the scope of the disclosure. For example, the technical features in the embodiments, embodiment examples, and modifications corresponding to the technical features in the respective aspects described in the section of SUMMARY can be replaced or combined as appropriate in order to achieve part or all of the above-mentioned effects. Further, if the technical features are not described as essential in the present specification, these can be deleted as appropriate.

What is claimed is:

1. A high pressure tank comprising:
a liner having a space in which a gas is sealed, the liner having a cylinder portion in a cylindrical shape and a pair of dome portions provided at both ends of the cylinder portion in an axial direction of the cylinder portion; and
a reinforcement layer configured to cover a periphery of the liner, wherein
a curved surface shape of each of the dome portions is an equally stressed curved surface shape when an internal pressure of the liner reaches a setting pressure set higher than an atmospheric pressure.

2. The high pressure tank according to claim 1 wherein, the setting pressure is a pressure that causes the liner to burst.

3. The high pressure tank according to claim 1 wherein, the setting pressure is a maximum charging pressure of the high pressure tank.

4. The high pressure tank according to claim 1, wherein an inclination of one of the dome portions relative to the cylinder portion at a joint portion between the cylinder portion and said one of the dome portions is 0 degrees and a radius of curvature of the joint portion is within a range of 6 mm to 30 mm, or
the inclination is 7 degrees and the radius of curvature of the joint portion is within a range of 10 mm to 20 mm.

* * * * *